(12) United States Patent
Lee et al.

(10) Patent No.: US 12,015,658 B1
(45) Date of Patent: Jun. 18, 2024

(54) APPARATUS AND METHOD FOR TRANSMITTING SPATIAL AUDIO USING MULTICAST

(71) Applicant: Clicked, Inc, Seoul (KR)

(72) Inventors: Ha Ram Lee, Seoul (KR); Tae Wook Kim, Goyang-si (KR)

(73) Assignee: Clicked, Inc, Seoul (KR)

( * ) Notice: Subject to any disclaimer, the term of this patent is extended or adjusted under 35 U.S.C. 154(b) by 0 days.

(21) Appl. No.: 18/362,310

(22) Filed: Jul. 31, 2023

(30) Foreign Application Priority Data

Mar. 15, 2023 (KR) .......................... 10-2023-0033641

(51) Int. Cl.
*H04L 65/611* (2022.01)
*H04S 7/00* (2006.01)

(52) U.S. Cl.
CPC ............ *H04L 65/611* (2022.05); *H04S 7/304* (2013.01); *H04S 2420/11* (2013.01)

(58) Field of Classification Search
CPC .............. H04L 65/611; H04L 12/6418; H04L 2012/64; H04S 7/304; H04S 2420/11; H04S 3/008; H04S 2400/01
USPC ......................................................... 709/231
See application file for complete search history.

(56) References Cited

U.S. PATENT DOCUMENTS

| | | | | |
|---|---|---|---|---|
| 6,785,809 B1* | 8/2004 | Hardjono | ............. | H04L 9/0833 380/278 |
| 7,720,212 B1* | 5/2010 | Jouppi | .................... | H04M 3/56 709/204 |
| 11,477,600 B1* | 10/2022 | Turner | ................ | H04R 1/1041 |
| 2018/0196123 A1* | 7/2018 | Mate | ....................... | H04S 7/303 |
| 2023/0123253 A1* | 4/2023 | Mate | ....................... | H04S 7/304 381/303 |
| 2023/0224668 A1* | 7/2023 | Jang | ...................... | G10K 15/08 381/17 |

FOREIGN PATENT DOCUMENTS

| | | |
|---|---|---|
| KR | 10-2331229 B1 | 11/2021 |
| WO | WO-0217579 A1 * 2/2002 | ......... H04L 12/6418 |

* cited by examiner

*Primary Examiner* — Glenford J Madamba
(74) *Attorney, Agent, or Firm* — Studebaker & Brackett PC

(57) ABSTRACT

Disclosed are an apparatus and method for transmitting a spatial audio by using multicast that are capable of efficiently transmitting spatial audio data of multiplayer content by using multicast. The spatial audio transmitting apparatus includes a plurality of servers communicatively connected to a plurality of client terminals executing multiplayer real-time content to be separated by a multicast group. A server included in the respective multicast group transmits the first player information to the other servers included in the multicast group in a multicast method so as to be shared when receiving first player information from a client terminal executing the multiplayer real-time content, and mixes spatial audio based on the first player information and the second player information and transmits the mixed spatial audio to the client terminal in a unicast method when receiving second player information from another server included in the multicast group.

7 Claims, 6 Drawing Sheets

APPARATUS AND METHOD FOR TRANSMITTING SPATIAL AUDIO USING MULTICAST

CROSS-REFERENCE TO RELATED APPLICATIONS

A claim for priority under 35 U.S.C. § 119 is made to Korean Patent Application No. 10-2023-0033641 filed on Mar. 15, 2023 in the Korean Intellectual Property Office, the entire contents of which are hereby incorporated by reference.

BACKGROUND

Embodiments of the inventive concept described herein relate to a spatial audio transmitting apparatus, and more particularly, relate to an apparatus and method for transmitting a spatial audio by using multicast capable of efficiently transmitting spatial audio data of multiplayer content by using multicast.

Generally, in a case of multiplayer real-time content such as online games, each player's data such as a position and voice chat data of each player needs to be shared with other players.

When 'N' players transmit data to 'N−1' players, a total of 'N(N−1)' pieces of data needs to be transmitted. Accordingly, as the amount of data to be shared increases, a network load increases in proportion to the square.

In a case of audio data, each player needs to collect all pieces of audio data of various channels received from other players and to convert the pieces of audio data into audio data (usually 2-channel stereo) supported by a player device.

However, a processor load in audio mixing may increase depending on the number of audio input channels.

In particular, because the processor performance of a mobile device is lower than that of a normal PC, the battery usage also increases as the load on a processor increases. Accordingly, it is necessary to restrict the number of input channels.

To solve these issues, in a case of a voice chat, instead of transmitting audio data directly from a player device to other player devices, a processor load due to network traffic and audio mixing may be reduced in a method in which the player device transmits the audio data to an audio streaming server, and the audio streaming server mixes audio data received from each player device and transmits the mixed audio data to each player device.

However, in a case of spatial audio, audio data generated by each player differs depending on a distance from a sound source and an orientation. Accordingly, the audio data needs to be mixed differently for each player.

As such, because more computation is required to mix the audio differently, it may be difficult for one audio streaming server to mix pieces of audio data of all players participating in content. This still requires data transmission 'N(N−1)' times.

Accordingly, a spatial audio transmitting apparatus capable of efficiently transmitting spatial audio data in multiplayer content is required to be developed in the future.

SUMMARY

Embodiments of the inventive concept provide a spatial audio transmitting apparatus and method using multicast that reduces a network load by eliminating redundant data transmission, and efficiently transmits spatial audio data by performing multicast transmission on player information of multiplayer real-time content received from a client terminal to servers included in a multicast group so as to be shared and mixing spatial audio data based on the shared player information.

Problems to be solved by the inventive concept are not limited to the problems mentioned above, and other problems not mentioned will be clearly understood by those skilled in the art from the following description.

According to an embodiment, a spatial audio transmitting apparatus includes a plurality of servers communicatively connected to a plurality of client terminals executing multiplayer real-time content to be separated by a multicast group. A server included in the respective multicast group transmits the first player information to the other servers included in the multicast group in a multicast method so as to be shared when receiving first player information from a client terminal executing the multiplayer real-time content, and mixes spatial audio based on the first player information and the second player information and transmits the mixed spatial audio to the client terminal in a unicast method when receiving second player information from another server included in the multicast group.

In an embodiment, when the plurality of servers are separated by the multicast group, servers communicatively connected to each other through the same network are grouped into one multicast group.

In an embodiment, when receiving the first player information, the server receives the first player information located in a 3-dimensional (3D) virtual space from a first client terminal executing the multiplayer real-time content.

In an embodiment, the first player information includes position information, orientation information, and voice information of a first player.

In an embodiment, when receiving the first player information, the server receives the first player information located in the 3D virtual space from the first client terminal in a unicast method.

In an embodiment, when mixing and transmitting the spatial audio, the server separates encoded voice information of a first player, and position and orientation information of the first player from the first player information when the first player information is received, separates encoded voice information of a second player and position and orientation information of the second player from the second player information when the second player information is received, generates raw audio data by decoding the encoded voice information of the first player and the encoded voice information of the second player, generates stereo audio data by mixing the raw audio data and the spatial audio based on the position and orientation information the first player and the position and orientation information the second player, and transmits compressed audio by encoding the stereo audio data.

In an embodiment, the server generates raw picture data by processing real-time rendering based on the position and orientation information the first player and the position and orientation information the second player and transmits compressed video by encoding the raw picture data.

In an embodiment, the server includes a unicast receiver that receives the first player information from the client terminal in the unicast method, a multicast receiver that receives the second player information from the another server in the multicast method, an audio decoder that outputs raw audio data by decoding encoded voice information of a first player separated from the first player information and encoded voice information of a second player separated from the second player information, a spatial audio engine that outputs stereo audio data by mixing the spatial audio based on position and orientation information of the first player separated from the first player information, position and orientation information of the second player separated from the second player information, and the raw audio data, an audio encoder that outputs compressed audio by encoding the stereo audio data, a multicast transmitter that transmits the first player information to another server in the multicast method, and a unicast transmitter that transmits the compressed audio to the client terminal in the unicast method.

In an embodiment, the server includes a real time renderer that outputs raw picture data by performing real-time rendering based on the position and orientation information of the first player separated from the first player information and the position and orientation information of the second player separated from the second player information, and a video encoder that transmits compressed video by encoding the raw picture data.

According to an embodiment, a spatial audio transmitting method of an apparatus including a plurality of servers communicatively connected to a plurality of client terminals to be separated by a multicast group includes receiving first player information from the client terminal, transmitting the first player information to the other servers included in the multicast group in a multicast method so as to be shared, receiving second player information from another server included in the multicast group, mixing spatial audio based on the first player information and the second player information, and transmitting the mixed spatial audio to the client terminal in a unicast method.

According to an embodiment, a computer program providing a spatial audio transmitting method, which is stored in a medium combined with a computer being a piece of hardware to execute one of the above-described methods.

In addition, another method and another system for implementing the inventive concept, and a computer-readable recording medium for recording a computer program for performing the method may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
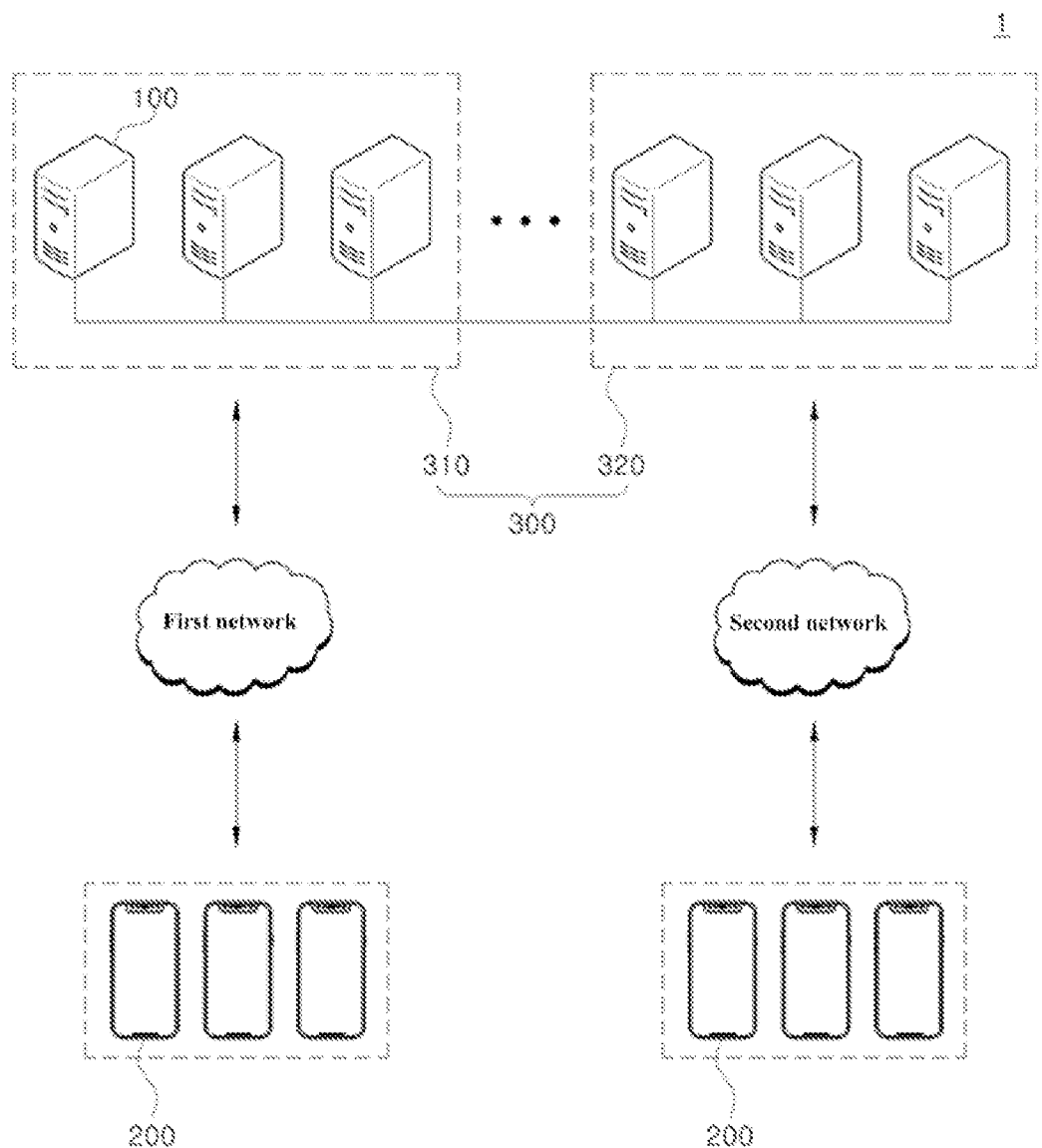
FIG. 1 is a diagram for describing a spatial audio transmitting apparatus, according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. The terms, such as those defined in commonly used dictionaries, should not be interpreted in an idealized or overly formal sense unless expressly so defined herein.

Hereinafter, an embodiment of the inventive concept will be described in detail with reference to the accompanying drawings.

Prior to a description, the meaning of terms used in the present specification will be described briefly. However, because the description of terms is used to help the understanding of this specification, it should be noted that if the inventive concept is not explicitly described as a limiting matter, it is not used in the sense of limiting the technical idea of the inventive concept.

FIG. 1 is a diagram for describing a spatial audio transmitting apparatus, according to an embodiment of the inventive concept.

As shown in FIG. 1, a spatial audio transmitting apparatus according to an embodiment of the inventive concept may include a plurality of client terminals 200 that execute multiplayer real-time content, and a plurality of servers 100 that are communicatively connected through a network and separated for each multicast group 300.

Here, when the plurality of servers 100 are separated for each multicast group 300, the servers 100 that are communicatively connected to each other through the same network may be grouped into one multicast group 300.

For example, as illustrated in FIG. 1, the plurality of servers 100 may be divided into a first multicast group 310 and a second multicast group 320, which is only an example, but is not limited thereto.

Here, the servers 100 included in the first multicast group 310 may be communicatively connected through a first network. The servers 100 included in the second multicast group 320 may be communicatively connected through a second network.

Moreover, the client terminal 200 may include a standing device such as a personal computer (PC), a network TV, a hybrid broadcast broadband TV (HBBTV), a smart TV, or an Internet protocol TV (IPTV), a mobile device or handheld device such as a smart phone, a tablet PC, a notebook, or a personal digital assistant (PDAs).

Next, the network communicatively connecting the client terminal 200 and the server 100 includes both wired and wireless networks, and collectively refers to a communication network supporting various communication standards or protocols for pairing or/and data transmission/reception between the client terminal 200 and the server 100.

This wired/wireless network may include all communication networks to be supported currently or in the future by standards, and may support all one or more communication protocols for the wired/wireless network.

For example, this wired/wireless network may be formed by networks for wired connection such as universal serial bus (USB), composite video banking sync (CVBS), component, S-Video (Analog), digital visual interface (DVI), high definition multimedia interface (HDMI), RGB, and D-SUB, and the communication standard or protocol therefor, and networks for wireless connection such as Bluetooth™, radio frequency identification (RFID), infrared data association (IrDA), ultra-wideband (UWB), ZigBee, digital living network alliance (DLNA), wireless LAN (WLAN) (Wi-Fi), wireless broadband (Wibro), world interoperability for microwave access (Wimax), high speed downlink packet access (HSDPA), long term evolution/LTE-Advanced (LTE/LTE-A), and Wi-Fi direct, and the communication standard or protocol therefor.

Next, when receiving first player information from the client terminal 200 executing multiplayer real-time content, the server 100 included in each multicast group 300 may transmit the first player information to the other server 100, which is included in the multicast group 300, in a multicast method so as to be shared. When receiving second player information from another server included in the multicast group 300, the server 100 included in each multicast group 300 may mix spatial audio data based on the first player information and the second player information and may transmit the mixed data to the client terminal 200 in a unicast method.

Here, when receiving the first player information, the server 100 may receive the first player information located in a 3-dimensional (3D) virtual space from a first client terminal executing multiplayer real-time content.

For example, the first player information may include position information, orientation information, and voice information of the first player, which is only one embodiment, but is not limited thereto.

Moreover, when receiving the first player information, the server 100 may receive the first player information located in a 3D virtual space from a first client terminal in a unicast method.

Next, when the server 100 receives the first player information while the server 100 transmits the first player information in the multicast method, the server 100 may obtain a group address of the multicast group 300 and may transmit the first player information to other servers in the multicast group 300 in a multicast method based on the obtained group address.

Here, when receiving the first player information, the server 100 may store the first player information in a database of the server 100 and then may transmit the first player information to other servers in the multicast group 300 in a multicast manner. Accordingly, all servers in the multicast group 300 may share the first player information.

Next, when receiving the second player information, the server 100 may receive the second player information from one of the other servers included in the multicast group 300 in a multicast manner.

Here, when receiving the second player information from a second client terminal running multiplayer real-time content, the other server may share the second player information by transmitting the second player information to the rest of the servers included in the multicast group 300 in a multicast method.

In this case, when receiving the second player information, the other server may receive the second player information located in the 3D virtual space from the second client terminal in the case where the second client terminal executes multiplayer real-time content For example, the second player information may include position information, orientation information, and voice information of the second player, which is only one embodiment, but is not limited thereto.

Furthermore, when receiving the second player information, the other server may receive the second player information located in the 3D virtual space from the second client terminal in a unicast method.

Besides, when the other server receives the second player information while the other server transmits the second player information in the multicast method, the other server may obtain a group address of the multicast group 300 and may transmit the second player information to the other servers in the multicast group 300 in the multicast method based on the obtained group address.

Here, when receiving the second player information, the other server may store the second player information in a database of the other server and then may transmit the second player information to the other servers in the multicast group 300 in a multicast manner. Accordingly, all servers in the multicast group 300 may share the second player information.

Next, when the first player information is received from the client terminal 200 in the unicast method, the server 100 may store the first player information in a database of the server 100. When the second player information is received from another server in the multicast method, the server 100 may store the second player information in the database of the server 100.

Next, when the server 100 mixes and transmits spatial audio, the server 100 may separate encoded voice information of a first player, and position and orientation information of the first player from the first player information when the first player information is received, may separate encoded voice information of a second player and position and orientation information of the second player from the second player information when the second player information is received, may generate raw audio data by decoding the encoded voice information of the first player and voice information of the second player, may generate stereo audio data by mixing the raw audio data and the spatial audio based on position and orientation information of each of the first player and the second player, and may transmit compressed audio by encoding the stereo audio data.

Here, when the server 100 transmits compressed audio, the server 100 may transmit the compressed audio to the client terminal 200 in a unicast method.

In some cases, the server 100 may generate raw picture data by processing real-time rendering based on the position and orientation information of each of the first player and the second player and then may transmit compressed video by encoding the raw picture data.

Here, when the server 100 transmits compressed video, the server 100 may transmit the compressed video to the client terminal 200 in a unicast method.

In the meantime, the multiplayer real-time content executed in the client terminal 200 may be content that supports spatial audio, and may enable players to experience more vividly.

Unlike pre-recorded content such as movies, the spatial audio needs to be generated in real time as the distance and orientation between the player and the sound source in the multiplayer real-time content change in real time.

For example, the multiplayer real-time content may be 3D virtual content such as metaverse, and a player of 3D virtual content may be a character in a 3D virtual space.

Accordingly, according to an embodiment of the inventive concept, player information positioned in a 3D virtual space of the multiplayer real-time content may be received from the client terminal 200 in a unicast method.

Here, the player information may include position information, orientation information, and voice information of a player, which is only one embodiment, but is not limited thereto.

Moreover, the inventive concept may be a device including a system that transmits content changing in real time by interacting with a user like a game, unlike simple audio/video streaming, and the device may transmit data reflecting the current state in real time unlike prerecorded/recorded audio/video streaming.

Next, the inventive concept may include an audio engine that provides spatial audio. The audio engine may be software that mixes audio data received from several channels and outputs the mixed audio data to an output channel (e.g., 2-channel stereo). When the position and orientation data of a sound source along with audio data are entered to an input audio channel, audio that enable a user to feel the sense of space may be output.

Moreover, the inventive concept may receive player information of multiplayer real-time content from the client terminal 200 in a unicast method. The unicast method may be a one-to-one transmission method in which one receiver receives data sent by one transmitter. When 'N' players share their state data through unicast, a total of 'N(N−1)' data transmissions are required.

Furthermore, the inventive concept may transmit player information of the multiplayer real-time content received from the client terminal 200 to the servers 100 included in the multicast group 300 in a multicast method so as to be shared.

The multicast method may be a method in which one transmitter transmits data to all receivers belonging to a multicast group in a one-to-many manner. Unlike unicast, when only one data is sent to a multicast group instead of separately sending the same data to each receiver, all receivers belonging to the group may receive the transmitted data. Accordingly, when 'N' players share their state data through multicast, data may be efficiently transmitted only N times.

As such, the inventive concept may transmit may group several audio streaming servers into one multicast group on the same network, and may transmit data to be shared between servers in a multicast method. Accordingly, redundant data transmission may be eliminated and a network load may be reduced because multicast is used instead of unicast. In addition, only servers need to be present in the same network, and thus client terminals may be free from physical positions of the client terminals.

As such, according to an embodiment of the inventive concept, it is possible to reduce a network load by eliminating redundant data transmission, and to efficiently transmit spatial audio data by performing multicast transmission on player information of multiplayer real-time content received from a client terminal to servers included in a multicast group so as to be shared and mixing spatial audio data based on the shared player information.

Figure 2:
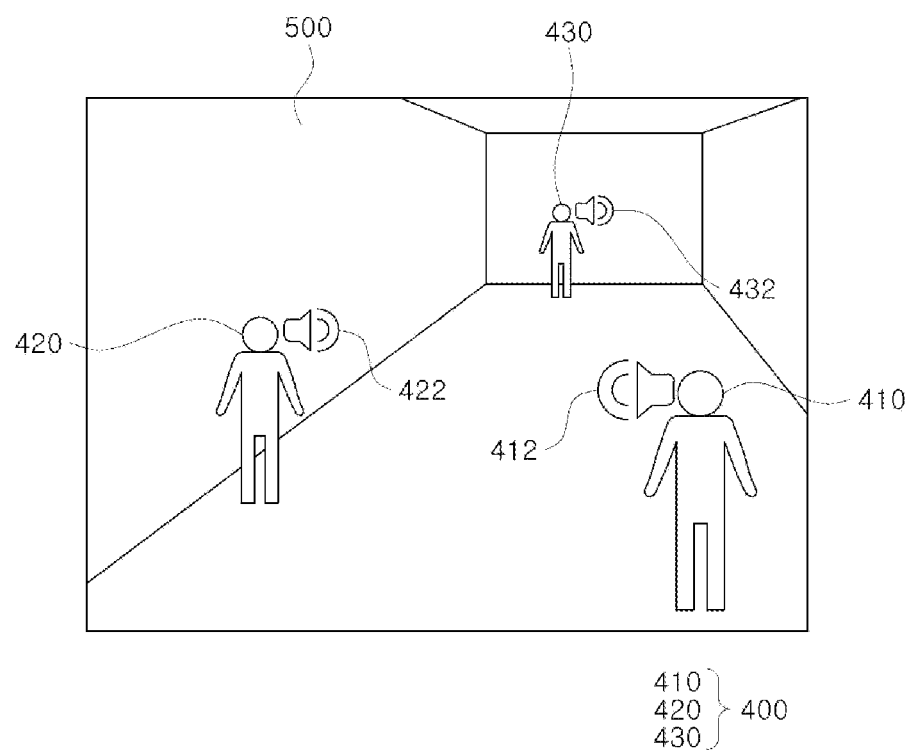
FIG. 2 is a diagram for describing player information of multiplayer real-time content executed in a client terminal of FIG. 1.

FIG. 2 is a diagram for describing player information of multiplayer real-time content executed in a client terminal of FIG. 1.

As shown in FIG. 2, multiplayer real-time content executed in a client terminal may be content that supports spatial audio.

For example, the multiplayer real-time content may be content having a 3-dimensional virtual space 500 such as metaverse. A player 400 in the 3D virtual space 500 may be a character in the 3D virtual space 500.

Here, unlike pre-recorded content such as movies, the spatial audio needs to be generated in real time as the distance and orientation between the player and the sound source in the multiplayer real-time content change in real time.

Accordingly, according to an embodiment of the inventive concept, information of the player 400 positioned in the 3D virtual space 500 of the multiplayer real-time content may be received from a client terminal in a unicast method.

Here, the information of the player 400 may include position information, orientation information, and voice information of the player 400, which is only one embodiment, but is not limited thereto.

As illustrated in FIG. 2, when a first player 410, a second player 420, and a third player 430 are present within the 3D virtual space 500, a voice 412 of the first player 410 may be the loudest because the first player 410 has the closest position compared to the second player 420 and the third player 430; a voice 422 of the second player 420 may be less than that of the first player 410 and greater than that of the third player 430 because the second player 420 is positioned farther than the first player 410 and positioned closer than the third player 430; and, a voice 432 of the third player 430 may be the smallest because the third player 430 has the furthest position compared to the first player 410 and the second player 420.

Accordingly, according to an embodiment of the inventive concept, the spatial audio may be mixed based on position information, orientation information, and voice information of the plurality of players 400 in a 3D virtual space so as to be efficiently transmitted to a client terminal.

Figure 3:
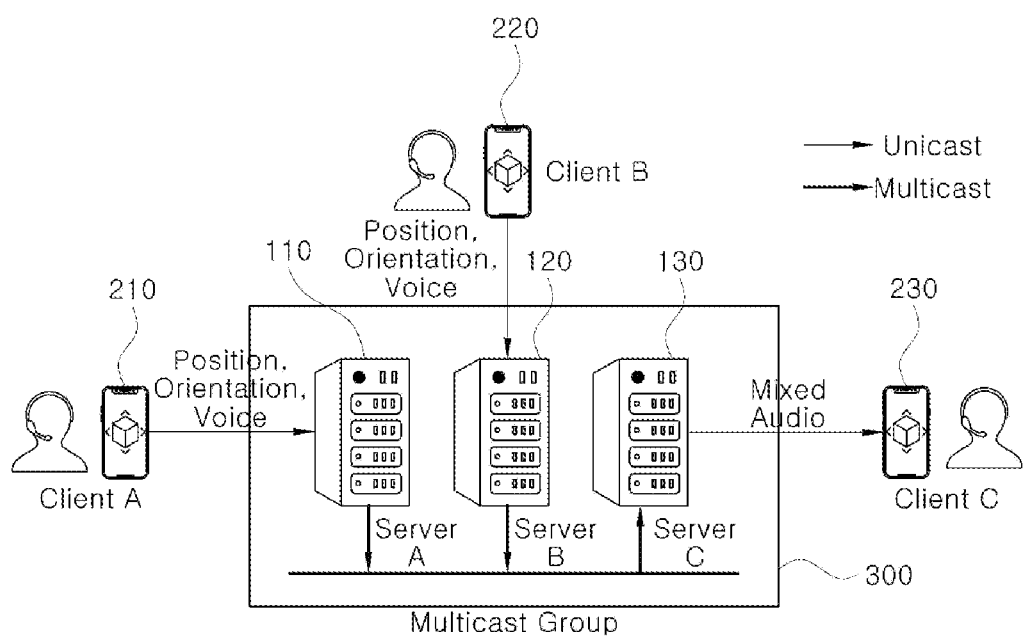
FIG. 3 is a diagram for describing an operation process of a server included in each multicast group of FIG. 1.

FIG. 3 is a diagram for describing an operation process of a server included in each multicast group of FIG. 1.

As shown in FIG. 3, according to an embodiment of the inventive concept, a plurality of servers that are communicatively connected to each other through the same network may be grouped into one multicast group 300.

For example, when a first server 110, a second server 120, and a third server 130 are included in the one multicast group 300, the first server 110 may receive first player information including a first player's position, orientation, and voice from a first client terminal 210, which executes multiplayer real-time content, in a unicast method, and the second server 120 may receive second player information including a second player's position, orientation, and voice from a second client terminal 220, which executes multiplayer real-time content, in a unicast method.

Besides, the first server 110 transmits the first player information including the first player's position, orientation, and voice to a multicast group address in a multicast method, and thus the first player information may be transmitted to the second server 120 and the third server 130 within the multicast group 300 in a multicast method so as to be shared.

Also, the second server 120 transmits the second player information including the second player's position, orientation, and voice to a multicast group address in a multicast method, and thus the second player information may be transmitted to the first server 110 and the third server 130 within the multicast group 300 in a multicast method so as to be shared.

Next, when the third server 130 receives the first player information and the second player information, and the third server 130 receives third player information including position, orientation, and voice of a third player from a third client terminal 230, which executes multiplayer real-time content, in a unicast method, the third server 130 may mix spatial audio by combining the first player information, the second player information, and the third player information and then may transmit the mixed spatial audio to the third client terminal 230 in a unicast method.

Also, when receiving the third player information including the position, orientation, and voice of the third player from the third client terminal 230 in a unicast method, the third server 130 transmits the third player information including the third player's position, orientation, and voice to a multicast group address in a multicast method, and thus the third player information may be transmitted to the first server 110 and the second server 120 within the multicast group 300 in a multicast method so as to be shared.

As such, the server according to an embodiment of the inventive concept may receive player information of multiplayer real-time content from a client terminal in a unicast method and then may transmit the mixed spatial audio to the client terminal in the unicast method.

Here, the unicast method may be a one-to-one transmission method in which one receiver receives data sent by one transmitter. When 'N' players share their state data through unicast, a total of 'N(N−1)' data transmissions are required.

Furthermore, the server according to an embodiment of the inventive concept may transmit player information of the multiplayer real-time content received from the client terminal to servers included in the multicast group in a multicast method so as to be shared.

Here, the multicast method may be a method in which one transmitter transmits data to all receivers belonging to a multicast group in a one-to-many manner. Unlike unicast, when only one data is sent to a multicast group instead of separately sending the same data to each receiver, all receivers belonging to the group may receive the transmitted data. Accordingly, when 'N' players share their state data through multicast, data may be efficiently transmitted only N times.

Figure 4:
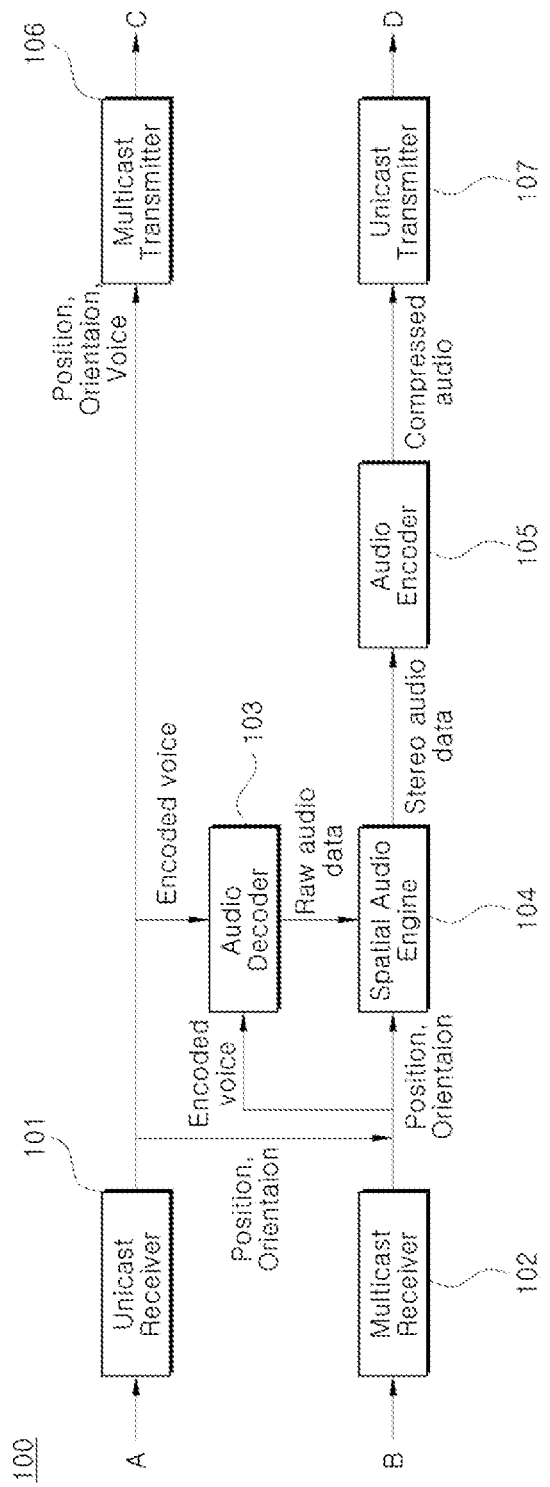
FIGS. 4 and 5 are block diagrams for describing a server of FIG. 1.
Figure 5:
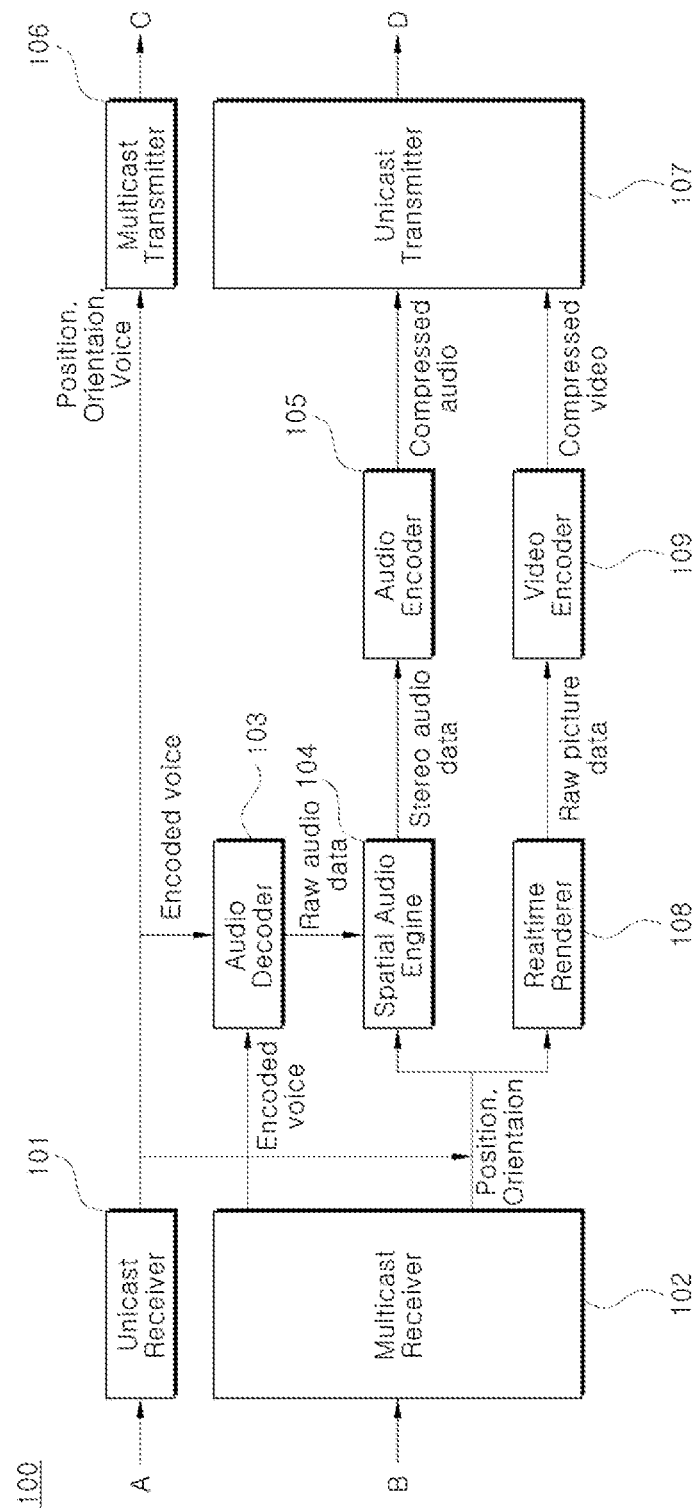

FIGS. 4 and 5 are block diagrams for describing a server of FIG. 1.

As illustrated in FIG. 4, the server 100 according to an embodiment of the inventive concept may include a unicast receiver 101, a multicast receiver 102, an audio decoder 103, a spatial audio engine 104, an audio encoder 105, a multicast transmitter 106, and a unicast transmitter 107.

Here, the unicast receiver 101 may receive first player information in a unicast method from a client terminal (A).

For example, the first player information may include position information, orientation information, and voice information of a first player.

Moreover, the multicast receiver 102 may receive second player information in a multicast method from another server in the multicast group (B).

For example, the second player information may include position information, orientation information, and voice information of a second player.

Next, the audio decoder 103 may output raw audio data by decoding encoded voice information of a first player separated from the first player information and encoded voice information of a second player separated from the second player information.

Next, the spatial audio engine 104 may output stereo audio data by mixing spatial audio based on the first player's position and orientation information separated from the first player information, the second player's position and orientation information separated from the second player information, and the raw audio data.

Here, the spatial audio engine 104 may be software that mixes audio data received from several channels and outputs the mixed audio data to an output channel (e.g., 2-channel stereo). When the position and orientation data of a sound source along with audio data are entered to an input audio channel, audio that enable a user to feel the sense of space may be output.

Moreover, the audio encoder 105 may output compressed audio by encoding the stereo audio data.

Next, the multicast transmitter 106 may transmit the first player information to another server within the multicast group in a multicast method (C).

Subsequently, the unicast transmitter 107 may transmit the compressed audio to the client terminal in a unicast method (D).

As illustrated in FIG. 5, the server 100 according to another embodiment of the inventive concept may include the unicast receiver 101, the multicast receiver 102, the audio decoder 103, the spatial audio engine 104, the audio encoder 105, the multicast transmitter 106, the unicast transmitter 107, a realtime renderer 108, and a video encoder 109.

Here, the unicast receiver 101 may receive first player information in a unicast method from a client terminal (A).

For example, the first player information may include position information, orientation information, and voice information of a first player.

Moreover, the multicast receiver 102 may receive second player information in a multicast method from another server in the multicast group (B).

For example, the second player information may include position information, orientation information, and voice information of a second player.

Next, the audio decoder 103 may output raw audio data by decoding encoded voice information of a first player separated from the first player information and encoded voice information of a second player separated from the second player information.

Next, the spatial audio engine 104 may output stereo audio data by mixing spatial audio based on the first player's position and orientation information separated from the first player information, the second player's position and orientation information separated from the second player information, and the raw audio data.

Here, the spatial audio engine 104 may be software that mixes audio data received from several channels and outputs the mixed audio data to an output channel (e.g., 2-channel stereo). When the position and orientation data of a sound source along with audio data are entered to an input audio channel, audio that enable a user to feel the sense of space may be output.

Moreover, the audio encoder 105 may output compressed audio by encoding the stereo audio data.

Next, the multicast transmitter 106 may transmit the first player information to another server within the multicast group in a multicast method (C).

Furthermore, the real time renderer 108 may output raw picture data by performing real-time rendering based on the position and orientation information of the first player separated from the first player information and the position and orientation information of the second player separated from the second player information.

Next, the video encoder 109 may output compressed video by encoding raw picture data.

Subsequently, the unicast transmitter 107 may transmit the compressed audio and the compressed video to a client terminal in a unicast method (D).

Figure 6:
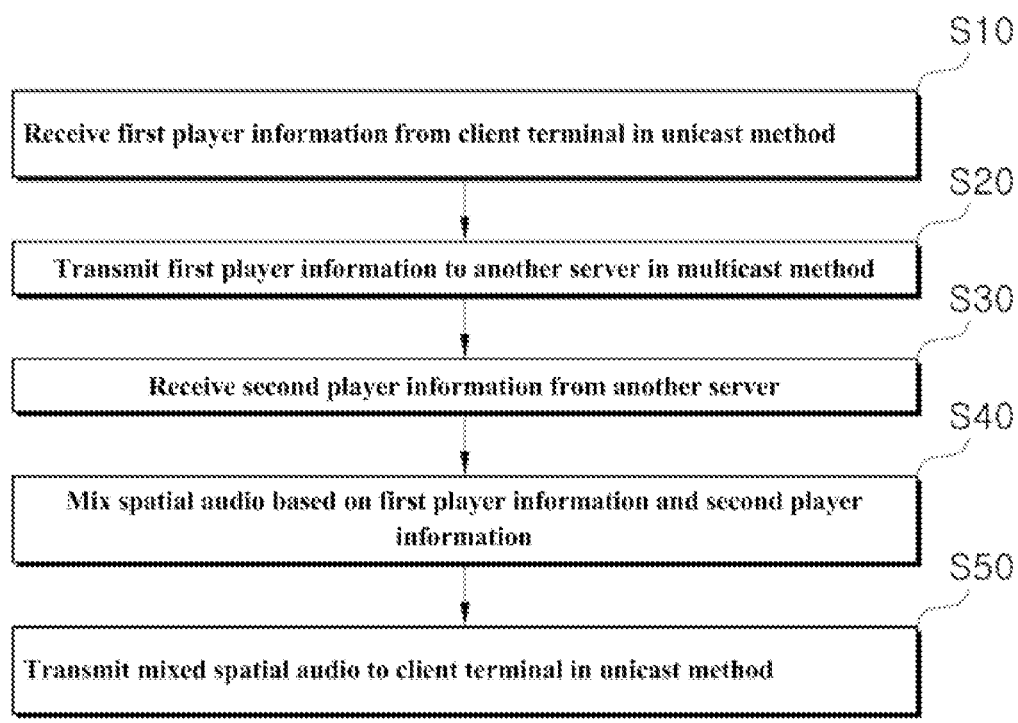
FIG. 6 is a flowchart for describing a spatial audio transmitting method, according to an embodiment of the inventive concept.

FIG. 6 is a flowchart for describing a spatial audio transmitting method, according to an embodiment of the inventive concept.

As shown in FIG. 6, the method according to an embodiment of the inventive concept may receive first player information from a client terminal in a unicast method (S10).

Here, the method according to an embodiment of the inventive concept may receive the first player information located in a 3D virtual space from a first client terminal executing multiplayer real-time content.

For example, the first player information may include position information, orientation information, and voice information of a first player.

Moreover, the method according to an embodiment of the inventive concept may transmit the first player information to other servers included in a multicast group in a multicast method so as to be shared (S20).

Next, the method according to an embodiment of the inventive concept may obtain a group address of the multicast group when receiving the first player information and may transmit the first player information to other servers in the multicast group in the multicast method based on the obtained group address.

Here, the method according to an embodiment of the inventive concept may store the first player information in a database and then may transmit the first player information to other servers in the multicast group in the multicast manner when receiving the first player information. Accordingly, all servers in the multicast group may share the first player information.

Next, the method according to an embodiment of the inventive concept may receive second player information from another server included in the multicast group in the multicast method (S30).

Next, the method according to an embodiment of the inventive concept may receive the second player information from one of the other servers included in the multicast group in a multicast manner.

For example, the second player information may include position information, orientation information, and voice information of a second player.

Subsequently, the method according to an embodiment of the inventive concept may mix spatial audio based on the first player information and the second player information (S40).

Next, the method according to an embodiment of the inventive concept may separate encoded voice information of a first player, and position and orientation information of the first player from the first player information when the first player information is received, may separate encoded voice information of a second player and position and orientation information of the second player from the second player information when the second player information is received, may generate raw audio data by decoding the encoded voice information of the first player and voice information of the second player, may generate stereo audio data by mixing the raw audio data and the spatial audio based on position and orientation information of each of the first player and the second player, and may output compressed audio by encoding the stereo audio data.

Furthermore, the method according to an embodiment of the inventive concept may transmit the mixed spatial audio to a client terminal in the unicast method (S50).

Besides, the method according to an embodiment of the inventive concept may generate raw picture data by processing real-time rendering based on the position and orientation information of each of the first player and the second player and then may transmit compressed video by encoding the raw picture data.

Subsequently, the method according to an embodiment of the inventive concept may transmit the compressed video to the client terminal in the unicast method.

According to an embodiment of the inventive concept, the system server 100 may consist of one or more cores, and may include a processor for data analysis and deep learning such as a central processing unit (CPU), a general purpose graphics processing unit (GPGPU), a tensor processing device (TPU) of a computing device. The system server 100 may read a computer program stored in a database and may process data for machine learning according to an embodiment of the inventive concept. According to an embodiment of the inventive concept, the system server 100 may perform an operation for learning a neural network. The system server 100 may perform calculations for neural network learning such as processing of input data for learning in deep learning (DL), feature extraction from input data, error calculation, or updating weights of a neural network using backpropagation. At least one of the CPU, GPGPU, and TPU of the system server 100 may process learning of the network function. For example, the CPU and the GPGPU may process learning of a network function and data classification using the network function, together. Also, in an embodiment of the inventive concept, the CPU and the GPGPU may process learning of the network function and data classification using the network function by using the processor of a plurality of computing devices. Also, a computer program executed in a computing device according to an embodiment of the inventive concept may be a program capable of executing the CPU, the GPGPU, or the TPU.

According to an embodiment of the inventive concept, a database may store computer programs for performing video and audio streaming, and the stored computer program may be read and driven by a processor. The database may store any type of information generated or determined by the system server 100 and any type of information received by a network unit.

According to an embodiment of the inventive concept, the database may include a storage medium of at least one type of a flash memory type, a hard disk type, a multimedia card micro type, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. The system server 100 may operate in connection with web storage that performs a storage function of the database on Internet. The description of the database described above is only an example, and is not limited thereto.

The system server 100 according to an embodiment of the inventive concept may further include an output unit and an input unit.

An output unit according to an embodiment of the inventive concept may display a user interface (UI) for providing video and audio streaming results. The output unit may store any type of information generated or determined by the system server 100 and any type of received information.

In an embodiment of the inventive concept, the output unit may include at least one of a liquid crystal display (LCD), a thin film transistor-liquid crystal display (TFT-LCD), an organic light emitting diode (OLED), a flexible display, or a 3D display. Some display modules thereof may be implemented with a transparent display or a light-transmitting display such that a user sees the outside through the display modules. This may be called a transparent display module, and a typical example of the transparent display module includes a transparent OLED (TOLED).

The input unit according to an embodiment of the inventive concept may receive a user input. The input unit may include keys and/or buttons on a user interface for receiving a user input, or physical keys and/or buttons. A computer program for controlling a display according to an embodiment of the inventive concept may be executed depending on a user input through an input unit.

The input unit according to an embodiment of the inventive concept may receive a signal by detecting a user's button operation or touch input, or receive a user's voice or motion through a camera or microphone and may convert it into an input signal. To this end, a speech recognition technology or motion recognition technology may be used.

The input unit according to an embodiment of the inventive concept may be implemented as an external input device connected to the system server 100. For example, the input device may be at least one of a touch pad, a touch pen, a keyboard, or a mouse for receiving a user input, but this is only an example and is not limited thereto.

The input unit according to an embodiment of the inventive concept may recognize a user touch input. The input unit according to an embodiment of the inventive concept may have the same configuration as an output unit. The input unit may be composed of a touch screen implemented to receive a user's selection input. The touch screen may use one of a contact capacitive method, an infrared light sensing method, a surface acoustic wave (SAW) method, a piezoelectric method, and a resistive film method. The detailed description of the touch screen described above is only an example according to an embodiment of the inventive concept, and various touch screen panels may be employed in the system server 100. The input unit composed of a touch screen may include a touch sensor. The touch sensor may be configured to convert pressure applied to a specific portion of the input unit or a change in capacitance occurring in a specific portion of the input unit into an electrical input signal. The touch sensor may be configured to detect not only a location and area to be touched, but also the pressure at a point in time when a touch is made. When there is a touch input to the touch sensor, the signal(s) corresponding to the touch input is sent to a touch controller. The touch controller may process the signal(s) and then may transmit the corresponding data to the system server 100. Accordingly, the system server 100 may recognize which region of the input unit has been touched.

As such, according to an embodiment of the inventive concept, it is possible to reduce a network load by eliminating redundant data transmission, and to efficiently transmit spatial audio data by performing multicast transmission on player information of multiplayer real-time content received from a client terminal to servers included in a multicast group so as to be shared and mixing spatial audio data based on the shared player information.

That is, in an embodiment of the inventive concept, because it is possible to use multicast instead of unicast, redundant data transmission may be eliminated and a network load may be reduced.

In addition, in an embodiment of the inventive concept, only servers need to be present in the same network, and thus client terminals may be free from physical positions of the client terminals.

The method according to an embodiment of the inventive concept may be implemented by a program (or an application) and may be stored in a medium such that the program is executed in combination with a server being hardware.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions executing the method, and the functions may include an execution procedure related control code necessary for the processor of the computer to execute the functions in its procedures. Furthermore, the code may further include a memory reference related code on which position (address) of an internal or external memory of the computer should be referenced by the media or additional information necessary for the processor of the computer to execute the functions. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The stored medium refers not to a medium, such as a register, a cache, or a memory, which stores data for a short time but to a medium that stores data semi-permanently and is read by a device. Specifically, for example, the stored media include, but are not limited to, ROM, RAM, CD-ROM, magnetic tape, floppy disk, optical data storage device, and the like. That is, the program may be stored in various recording media on various servers, which the computer may access, or in various recording media on the computer of the user. Further, the media may be distributed in computer systems connected over a network such that codes readable by the computer are stored in a distributed manner.

Steps or operations of the method or algorithm described with regard to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

According to an embodiment of the inventive concept, it is possible to reduce a network load by eliminating redundant data transmission, and to efficiently transmit spatial audio data by performing multicast transmission on player information of multiplayer real-time content received from a client terminal to servers included in a multicast group so as to be shared and mixing spatial audio data based on the shared player information.

That is, in an embodiment of the inventive concept, because it is possible to use multicast instead of unicast, redundant data transmission may be eliminated and a network load may be reduced.

In addition, in an embodiment of the inventive concept, only servers need to be present in the same network, and thus client terminals may be free from physical positions of the client terminals.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A spatial audio transmitting apparatus, the apparatus comprising:
a plurality of servers communicatively connected to a plurality of client terminals executing multiplayer real-time content to be separated by a multicast group,
wherein a server included in the respective multicast group is configured to:
when receiving first player information from a first client terminal executing the multiplayer real-time content, transmit the first player information to the other servers included in the multicast group in a multicast method so as to be shared;
wherein, when receiving the first player information, the server receives the first player information located in a 3-dimensional (3D) virtual space from the first client terminal executing the multiplayer real-time content;
wherein the first player information includes position information, orientation information, and voice information of the first player; and
wherein, when receiving the first player information, the server receives the first player information located in the 3D virtual space from the first client terminal in the unicast method; and
when receiving second player information from another server included in the multicast group, mix spatial audio based on the first player information and the second player information and transmit the mixed spatial audio to the client terminal in a unicast method.

2. The apparatus of claim 1, wherein, when the plurality of servers are separated by the multicast group, servers communicatively connected to each other through the same network are grouped into one multicast group.

3. The apparatus of claim 1, wherein the server is configured to:
when mixing and transmitting the spatial audio, separate encoded voice information of a first player, and position and orientation information of the first player from the first player information when the first player information is received;
separate encoded voice information of a second player and position and orientation information of the second player from the second player information when the second player information is received;
generate raw audio data by decoding the encoded voice information of the first player and the encoded voice information of the second player;
generate stereo audio data by mixing the raw audio data and the spatial audio based on the position and orientation information the first player and the position and orientation information the second player; and
transmit compressed audio by encoding the stereo audio data.

4. The apparatus of claim 3, wherein the server is configured to:
generate raw picture data by processing real-time rendering based on the position and orientation information the first player and the position and orientation information the second player; and
transmit compressed video by encoding the raw picture data.

5. The apparatus of claim 1, wherein the server includes:
a unicast receiver configured to receive the first player information from the client terminal in the unicast method;
a multicast receiver configured to receive the second player information from the another server in the multicast method;
an audio decoder configured to output raw audio data by decoding encoded voice information of a first player separated from the first player information and encoded voice information of a second player separated from the second player information;
a spatial audio engine configured to output stereo audio data by mixing the spatial audio based on position and orientation information of the first player separated from the first player information, position and orientation information of the second player separated from the second player information, and the raw audio data;
an audio encoder configured to output compressed audio by encoding the stereo audio data;
a multicast transmitter configured to transmit the first player information to another server in the multicast method; and
a unicast transmitter configured to transmit the compressed audio to the client terminal in the unicast method.

6. The apparatus of claim 5, wherein the server includes:
a real time renderer configured to output raw picture data by performing real-time rendering based on the position and orientation information of the first player separated from the first player information and the position and orientation information of the second player separated from the second player information; and a video encoder configured to transmit compressed video by encoding the raw picture data.

7. A spatial audio transmitting method of an apparatus including a plurality of servers communicatively connected to a plurality of client terminals to be separated by a multicast group, the method comprising:

receiving, by a server included in the respective multicast group, first player information from a first client terminal;

wherein, when receiving the first player information, the server receives the first player information located in a 3-dimensional (3D) virtual space from the first client terminal executing the multiplayer real-time content;

wherein the first player information includes position information, orientation information, and voice information of the first player; and wherein, when receiving the first player information, the server receives the first player information located in the 3D virtual space from the first client terminal in the unicast method;

transmitting by the server the first player information to the other servers included in the multicast group in a multicast method so as to be shared;

receiving by the server second player information from another server included in the multicast group;

mixing by the server spatial audio based on the first player information and the second player information; and transmitting by the server the mixed spatial audio to the client terminal in a unicast method.

* * * * *